June 4, 1935.   E. J. LAUTERBUR ET AL   2,003,716
APPARATUS FOR CONVEYING AND CONDITIONING PULVERULENT MATERIAL
Filed April 6, 1931   5 Sheets-Sheet 2

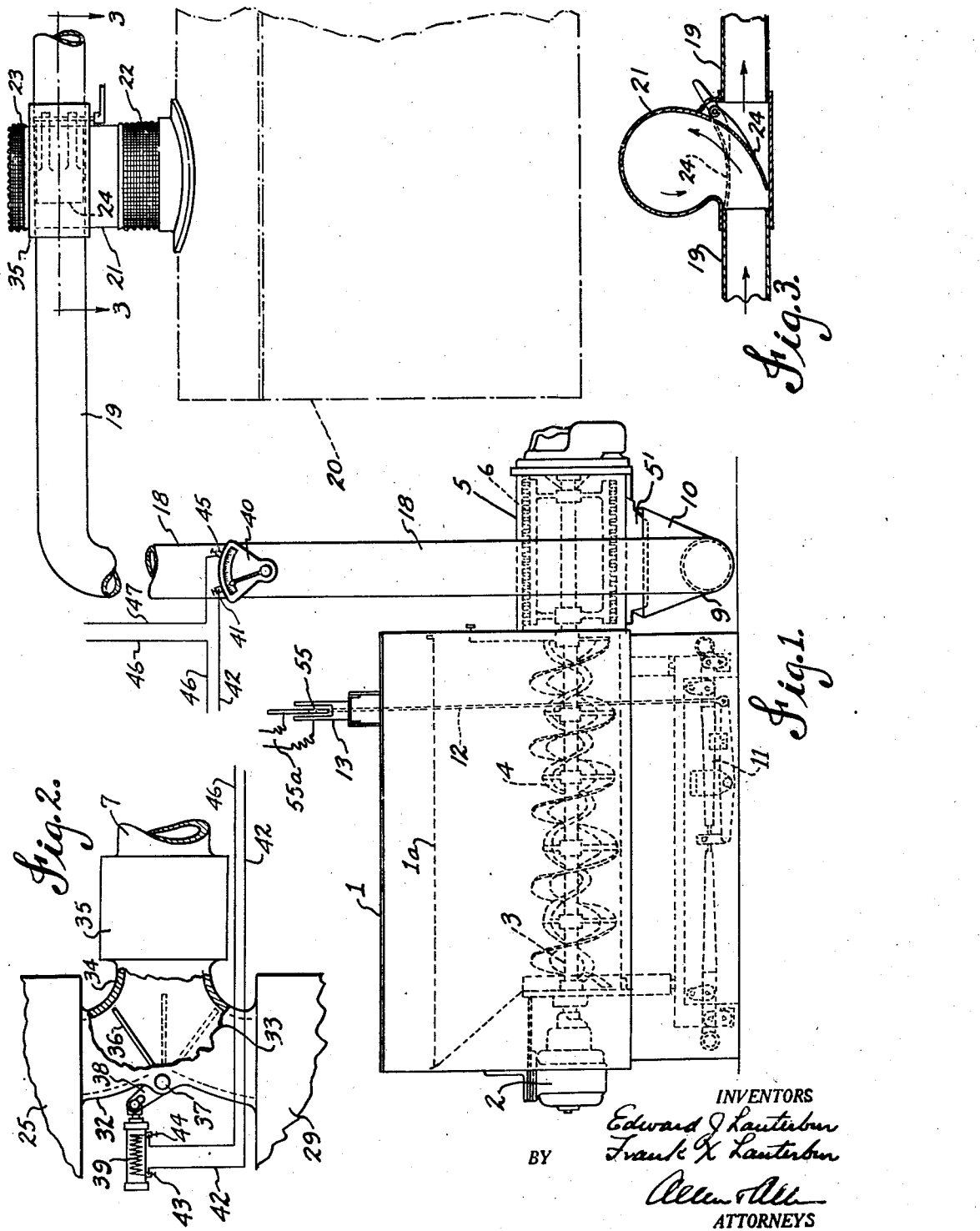

INVENTORS
Edward J. Lauterbur
Frank X. Lauterbur
Allen Allen
ATTORNEYS

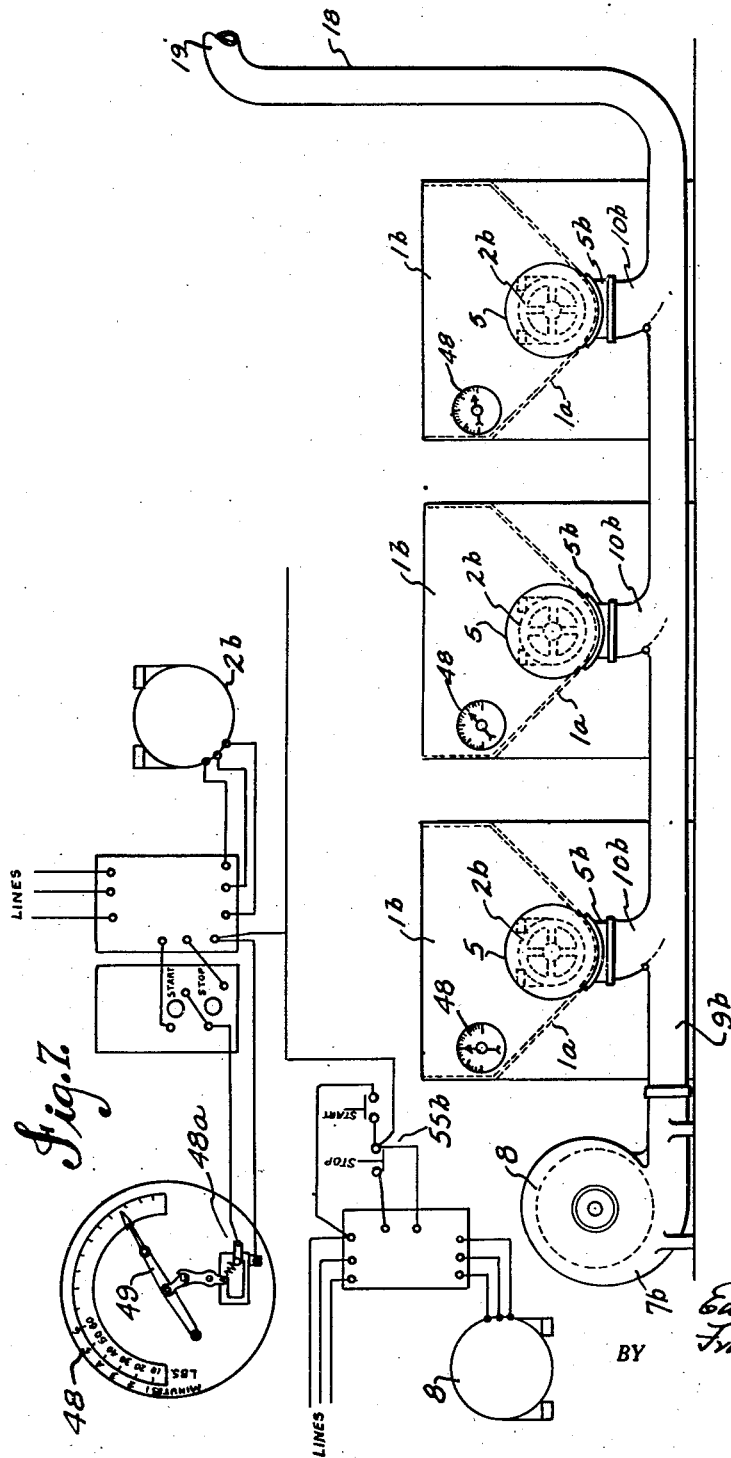

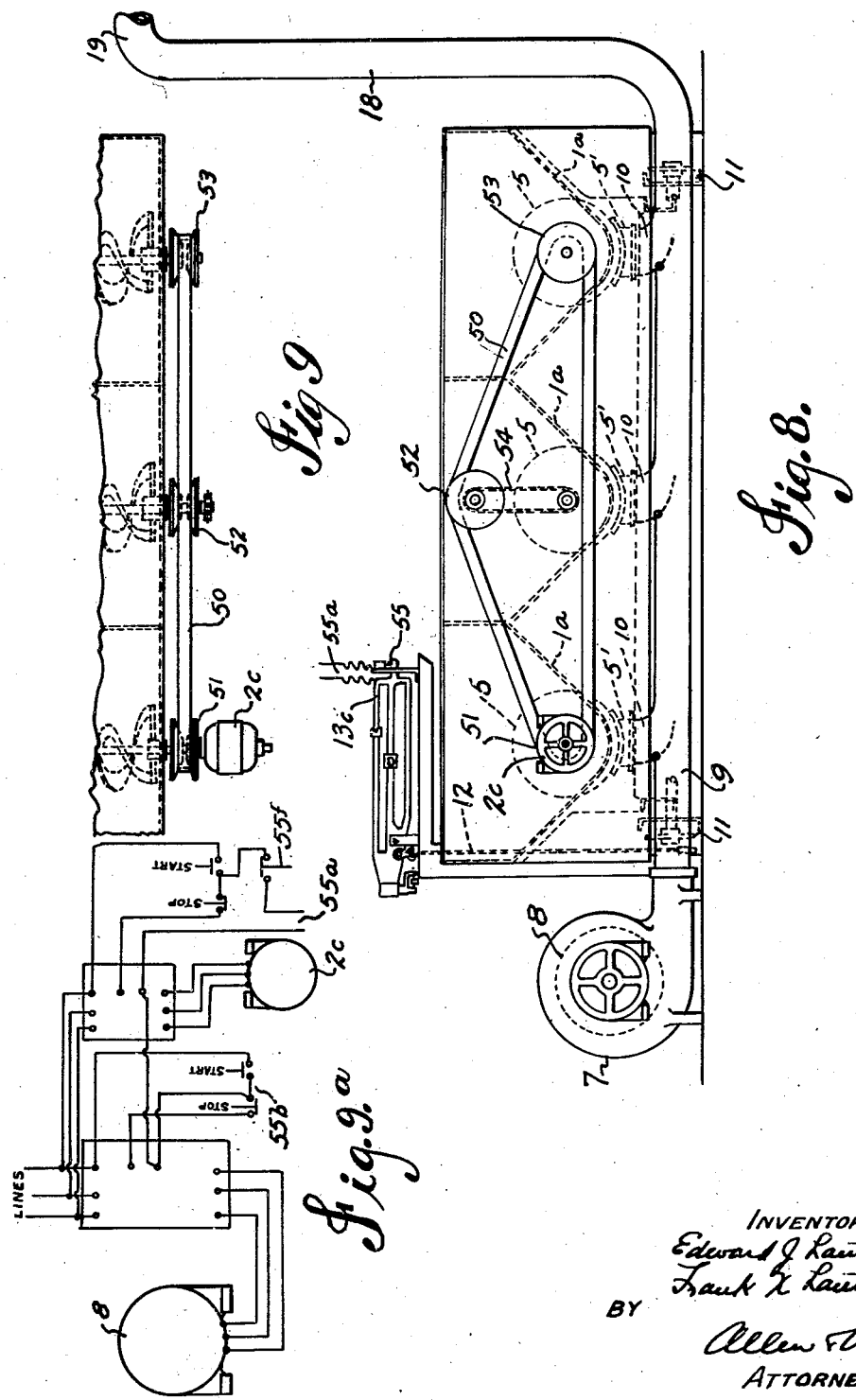

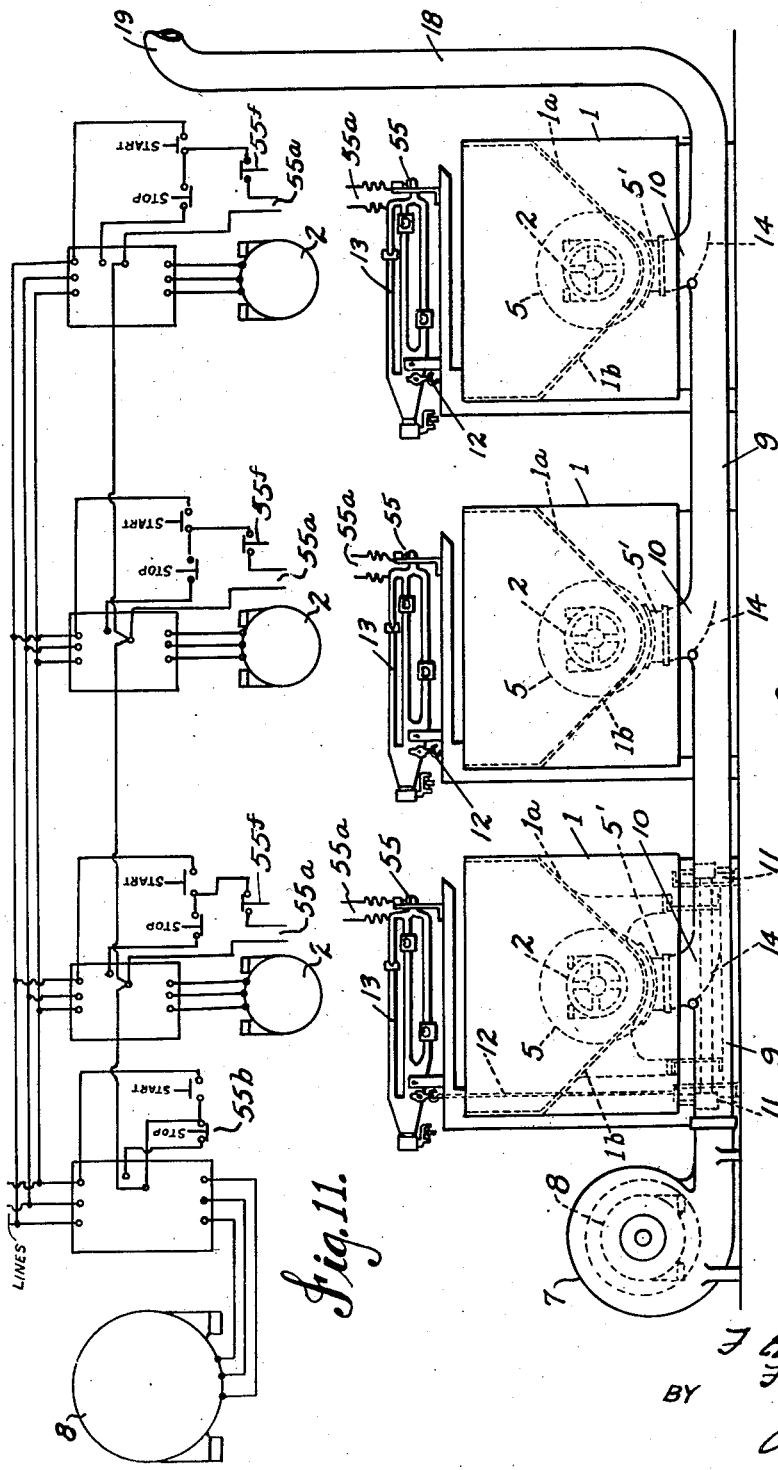

Patented June 4, 1935

2,003,716

UNITED STATES PATENT OFFICE 2,003,716

APPARATUS FOR CONVEYING AND CONDITIONING PULVERULENT MATERIAL

Edward J. Lauterbur and Frank X. Lauterbur, Sidney, Ohio, assignors to The Peerless Bread Machine Company, Sidney, Ohio, a corporation of Ohio Application April 6, 1931, Serial No. 527,893

3 Claims. (Cl. 302—17)

Our invention relates to apparatus and methods of conveying and conditioning pulverulent materials such as flour.

In the art there has been considerable development in devices for automatically controlling weighing, blending, elevating and sifting machines such, for example, as are disclosed in our applications, Ser. Nos. 329,739, filed Jan. 2, 1929, and 400,657, filed Oct. 18, 1929. The usual conveying mechanism for such flour handling apparatus, and for apparatus of similar nature for handling pulverulent materials are bucket conveyors and screw conveyors. Such conveyors are expensive to build and operate, and have many disadvantages which it is one of the objects of our invention to overcome.

One of the broad features of our invention is the provision of conduits through which pulverulent material is to be conveyed, in which, by the use of an air blast and a receiving hopper constructed on the Venturi principle, receiving the diffused material from the sifter and aspirating the material into the moving gas current, the conveying of the material is accomplished with the material maintained in diffused condition, impossible with mechanical conveyors.

By conditioning the air during such a conveying operation, we condition the material as to temperature or moisture while being carried diffused in the current of vapor so that the desired temperature, humidity, or dryness may be imparted to the material thoroughly and uniformly, also impossible on mechanical conveyors.

Another object of our invention is to arrange means for either heating or cooling the carrying vapor, with thermostatic controls arranged at a point adjacent the delivery end of the conduit for regulating the heating, cooling, or humidifying treatment of the initial supply of vapor in accordance with predetermined standards.

We have shown our proposed new system of conveying and conditioning pulverulent material in combination with different types of flour handling apparatus, it being understood that we do not desire to limit ourselves particularly to the handling of flour, but that the invention will be adapted for use with other materials in which similar treatments are required.

Referring to the drawings:—

Figure 1 is a general side elevation of apparatus embodying our invention.

Fig. 2 is an enlarged detail of the two-way valve and its controlling solenoid between the heating and cooling devices.

Fig. 3 is a partial horizontal cross section on the plane of the line 3, 3 of Fig. 1.

Fig. 6 illustrates a series of devices corresponding to the device shown in Figs. 4 and 5, but time controlled instead of weight controlled.

Fig. 7 is a diagram of the wiring connections of one of the devices of Fig. 6, the time controlled device being shown in detail on a scale enlarged from that of Fig. 6.

Fig. 8 is a view similar to Fig. 6, showing a further modification in which variable speed pulleys and a belt are used, and the device being weight controlled.

Fig. 9 is a partial plan view of the device of Fig. 8.

Fig. 9a is a wiring diagram of the electrical control of this device.

Fig. 10 is a view similar to Figs. 6 and 8, in which each device is separately weight controlled.

Fig. 11 is a diagram of the wiring connections of the device of Fig. 10.

Figure 4:
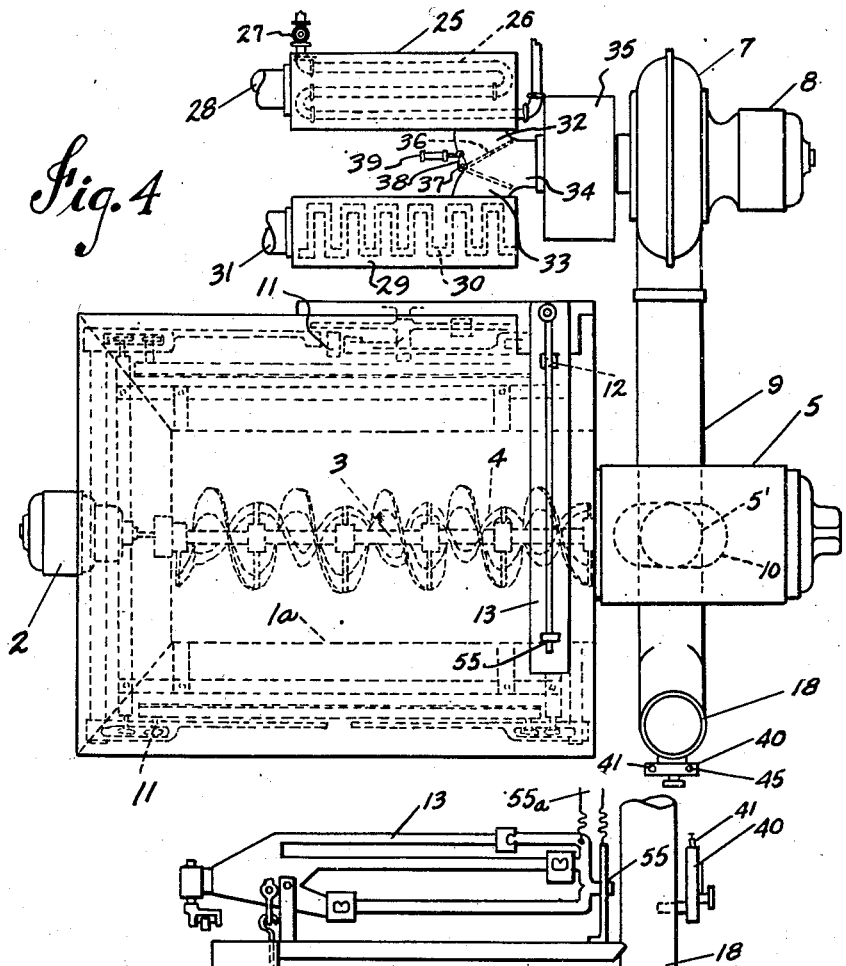
Fig. 4 is a partial plan view of the device.
Figure 5:
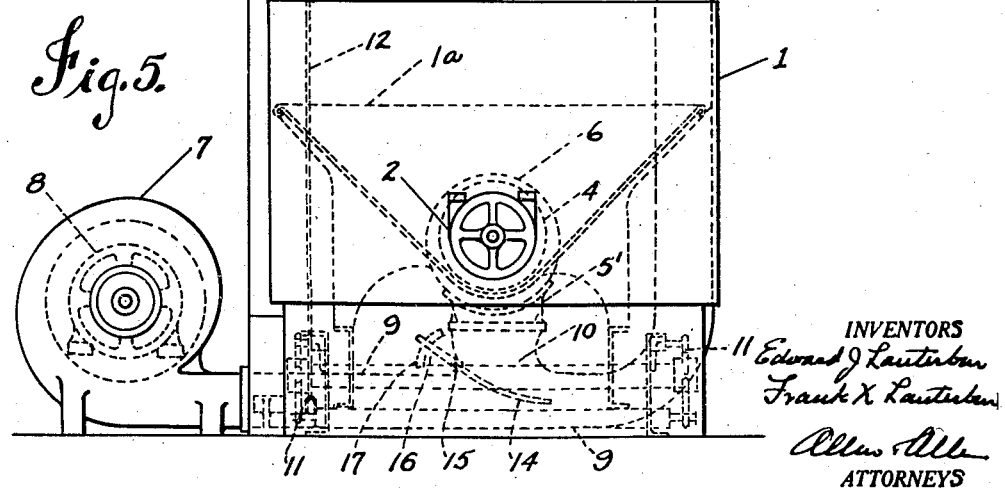
Fig. 5 is a partial end elevation of the device, looking to the right in Fig. 1.

As illustrated in Figs. 1 to 5 inclusive, the blending bin 1 has an electric motor 2, at one end directly connected to a shaft 3, having fixed thereon within the bin 1, the blending agitator blades 4. The interior of the bin 1, as best seen in Fig. 5, comprises a hopper 1a having its bottom sloping down from each side to the middle and meeting in arc-shaped cross section, along which the blades 4 operate, agitating and blending the material and forcing it out at the opposite end of the bin 1 into the sifter casing 5, into which the shaft 3 extends, carrying on its extension in the casing 5 an agitator 6 of the brush type. The bottom of the sifter casing 5 has a funnel-shaped outlet 5'. At the left side of the bin 1, as seen in Fig. 5, is the blower 7, operated by the electric motor 8, and a conduit 9 extends from the blower along the end of the blending bin 1, under the sifter casing 5 where this conduit has an upwardly presented funnel-shaped opening 10 down into which the bottom opening 5' of the sifter casing extends. This outlet 5' fits movably in the inlet 10, because the hopper part 1a is hung on a scale beam combination 11, which is connected by the upright rod 12 with the weighing scale 13 on the top of the bin 1; it being understood that this scale mechanism is properly proportioned and counter-balanced to compensate for the tare represented by the weight of the hopper 1a and the mechanism, including the agitator 3 and motor 2, carried therewith.

Where the inlet 10 joins the conduit 9, the conduit has inside of it the gate 14, having a hinge 15 in the side of the inlet 10 next to the blower 7. The shaft of this hinge 15 extends outside the conduit and has on it a lever 16 swinging on a segment 17, by means of which the gate 14 may be set at different angles, to close the inlet 10 entirely, or to leave it more or less open; the gate 14 extending in the direction of the blast from the motor 7, past the inlet 10, preventing back flow of the current to the sifter. By thus adjusting the size of the inlet from the sifter casing 5 to the conduit 9, so that, with the constant speed of operation of the blending agitators, and of the blower 7 and consequent blast of air, the material will be drawn from the sifter into the conduit 9, according to the aspirator principle, at various rates, as may be desired.

The conduit 9 curves upward some distance past the inlet 10 into an upright part 18, which curves to a horizontal part 19. The mixing bowl 20, shown by broken lines in Fig. 1, has at its top the separator dome 21, which has part 22 of its wall near its base, and also its top part 23, made of a pervious material, such as a fabric, and the horizontal part 19 of the conduit opens tangentially into the side of this dome when the shutter 24 is open, as shown by solid lines in Fig. 3. Thus entering, the mixture of air and the material carried thereby whirls in the separator 21 in cyclone manner, so that most of the air escapes through the pervious parts 22 and 23, while the material drops gently into the interior of the mixing bowl 20. In Figs. 1 and 3 the conduit part 19 is shown as continuing past the separator 21 shown, and from this it will be understood that any desired number of mixing bowls 20 may be served by the continuation of the conduit part 19, with tangential entrances, as described, into the succeeding separators 21, not shown.

As best shown in Fig. 4, the blower 7 which creates the blast of air acting through the apparatus just described, receives its air from a device adapted to impart to the carried material the desired temperature and humidity, or dryness. To supply cold air a casing 25 contains pipe coils 26, partly shown, understood to be supplied with a suitable refrigerant under control of the valve 27. This casing has the air inlet 28. For supplying heated air a casing 29 contains electric heating coils 30, understood to be supplied with current from any suitable source, not shown; and this casing 29 has the air inlet 31. The casings 25 and 29 have respective outlets 32 and 33 which join to form a Y, the third branch 34 of which enters the casing 35, which in turn, discharges to the inlet of the blower 7. This casing 35 may contain water or other desired liquid for imparting the desired humidity to the air passing from the cooler 25, or the heater 29, or both, as the air is drawn through this casing 35 into the blower 7. The proportion of cold air to that of heated air may be controlled by a shutter or damper 36 within the branches of the Y connection, and having its hinge 37 at the junction of the branches 32 and 33; the hinge having its shaft extended out and connected by an arm 38 to the armature of a solenoid 39. This construction is better seen on an enlarged scale in Fig. 2. The upright part 18 of the conduit leading from the sifter to the mixer has in it a thermostat 40, having a terminal 41 connected by a wire 42 with one terminal 43 of the solenoid 39, while the other terminal 44 of the solenoid and the other terminal 45 of the thermostat are connected, respectively, by wires 46 and 47 with a suitable source of current, not shown. This wiring connection is shown partly in Fig. 1, and partly in Fig. 2; but will be readily understood by the correspondence of the reference characters applied to the wires. The shutter 36 thus may be shifted automatically under the influence of temperature in the conduit through which the material is being carried by the air blast, thus allowing the temperature to be maintained within desired limits. Since the humidity of the air, as imparted by the humidifier 35, or elsewhere derived, supposing the source of moisture to be uniform, is proportionate to the temperature, such automatic control of the damper 36 also affords the practical control of the humidity.

In the modification of Figs. 6 and 7, the several blending bins 1b are similar to those of Figs. 1 to 5, inclusive, as also is the blower 7b and the conduit 9b, which, however, need not have its inlets 10b loose from the sifter outlets 5b; because in this example the amount of material delivered from each bin 1b is determined by a time controlling device 48, set in advance, with reference to the known rate of discharge from each bin and sifter. Each such device 48, as shown in Fig. 7, comprises a dial, with a hand 49 which may be set therearound, while it will be understood that the device 48 includes a suitable clock mechanism, either electric, spring or other suitable kind, with arrangement so that the device 48, after the manner of operation of an alarm clock, opens switch 48a controlling current to the motor 2b of the respective bin and sifter.

In Figs. 8 and 9 the bins 1c are all weight controlled by a common weighing scale 13c, and the arrangement of the sifters, the blower and the conduit, are as in Figs. 1 to 5 inclusive. In this example a single motor 2c drives the mechanism of all of the bins and sifters by means of a belt 50 passing around pulleys 51, 52 and 53 for the respective mechanisms; the elevated pulley 52 of the middle mechanism being connected by a belt 54 with its mechanism. These pulleys are, as seen in Fig. 9, well known opposed adjustable cones, allowing the operative diameter to be varied, and thus vary the speed of any one of the bin and sifter mechanisms. In this example, therefore, the amount of material delivered from any one bin and sifter is determined by the rate of operation of its mechanism, rather than by the period of time of its operation as in Figs. 6 and 7.

In Figs. 10 and 11 the several bins and sifters are the same as in Figs. 1 to 5 inclusive, each having its distinct weighing scale.

In all examples where the weighing scale is used, it acts through an electrical contact 55 and wires 55a to open or close the circuit of the motor driving the bin and sifter mechanism. The motor that drives the blower for creating the air blast through the conduit, will be started by completion of any one of these circuits, but it will continue to operate until a separate stop button 55f is pressed.

The humidifier 35 is shown at the initial entrance of the system, at the blower 7. However, it will be understood that moisture can be introduced at the inlet to the mixing bowl 20, either in the conduit part 19 itself, or directly into the separator dome 21. Moisture added at this point to the material particles will cause them to drop more readily into the mixer, and also insure quick absorption of most of the water added in mixing. With such control as is exemplified, this quantity of moisture may be very easily controlled, and can be a part of the total water or moisture to be used in the mixture.

From the manner of equipping the hot and cold air controlling device 36 with the solenoid 39, it may be understood that the gate 14, constituting the adjustable venturi from the blending and mixing device and the conduit may be likewise controlled; and where a number of such devices discharge successively into a single conduit, each may be equipped with such an electrical control device. Whether only one or a number of such devices be thus provided, the solenoid would have its current controlled along with the control of current of the motor driving the blending and sifting mechanism, rather than by a thermostat, as in the device illustrated. Each branch 32 and 33 may have a separate shutter 36 and solenoid 39 connected with the thermostat 40.

In the baking industry it has become of increasing importance that the condition of the ingredients which are mixed in a dough mixer is controlled as to their condition of temperature and humidity, so that the desired time of operation of the mixing can be accurately predicted. Our conveying and conditioning apparatus and our new method of accomplishing this lends itself readily to accuracy in the control of the physical condition of the ingredients which go into the dough batch. Further, if reference be made to our co-pending applications hereinbefore referred to, it will be noted that the entire mechanism, including the conveyor, forms part of the apparatus which was part of the tare weight carried by the scales. With the Venturi tube discharge, the pipe extending down into the conveyor need not be sealed, so that the conveyor conduit in our present arrangement need not be carried on the scale.

Our method, while particularly adaptable in the handling of flour, is also adapted for use for other pulverulent material of sufficiently light texture as will be carried in a current of air.

It is also a feature of our invention, particularly when used with flour, that the individual flakes of flour are carried along in light, flakey-like condition without the tendency to mat and ball up, which is always present in the use of mechanical bucket and screw conveying mechanism.

Having thus described our invention, what we claim as new and desire to secure by Letters Patent, is:—

1. In apparatus of the character described, a receptacle, supply means for pulverulent material, supply means for warm air, supply means for cold air, a blower receiving air from either one of said air supply means, and a conduit leading from said blower past said material supply means to said receptacle, and having an inlet from said material supply means and means causing air current from the blower to aspirate material from said supply means into said conduit, a thermostatic device near the path of travel of said material from said material supply means to said receptacle, and means whereby said thermostatic device varies the proportions of warm air and cold air supplied to said blower.

2. In combination with means for supplying pulverulent material, a conduit into which said means discharges, a blower forcing gaseous medium into said conduit, a heater, a cooler, a moisture container, an inlet to said blower from said moisture container, and an inlet to said moisture container having branches leading from the heater and the cooler, respectively, shutter means closing either branch while opening the other branch, and means controlled by the temperature in said conduit, for operating said shutter means.

3. In apparatus for delivering pulverulent materials, a supply device to discharge the material in diffused condition, a weighing scale on which said device is poised, a conduit having an inlet in receptive relation to said supply device, out of contact with said supply device to permit weighing movement of the device, means for forcing a gaseous current through said conduit past said inlet, a baffle in said conduit, and means holding said baffle in position whereby it is interposed between said forcing means and said inlet, across and divergent from said inlet in the direction of said current, causing aspiration of the received diffused material through the conduit and preventing back flow of the current to the supply device or out through the space between the conduit and said supply device.

EDWARD J. LAUTERBUR.
FRANK X. LAUTERBUR.